United States Patent Office 3,389,485
Patented June 25, 1968

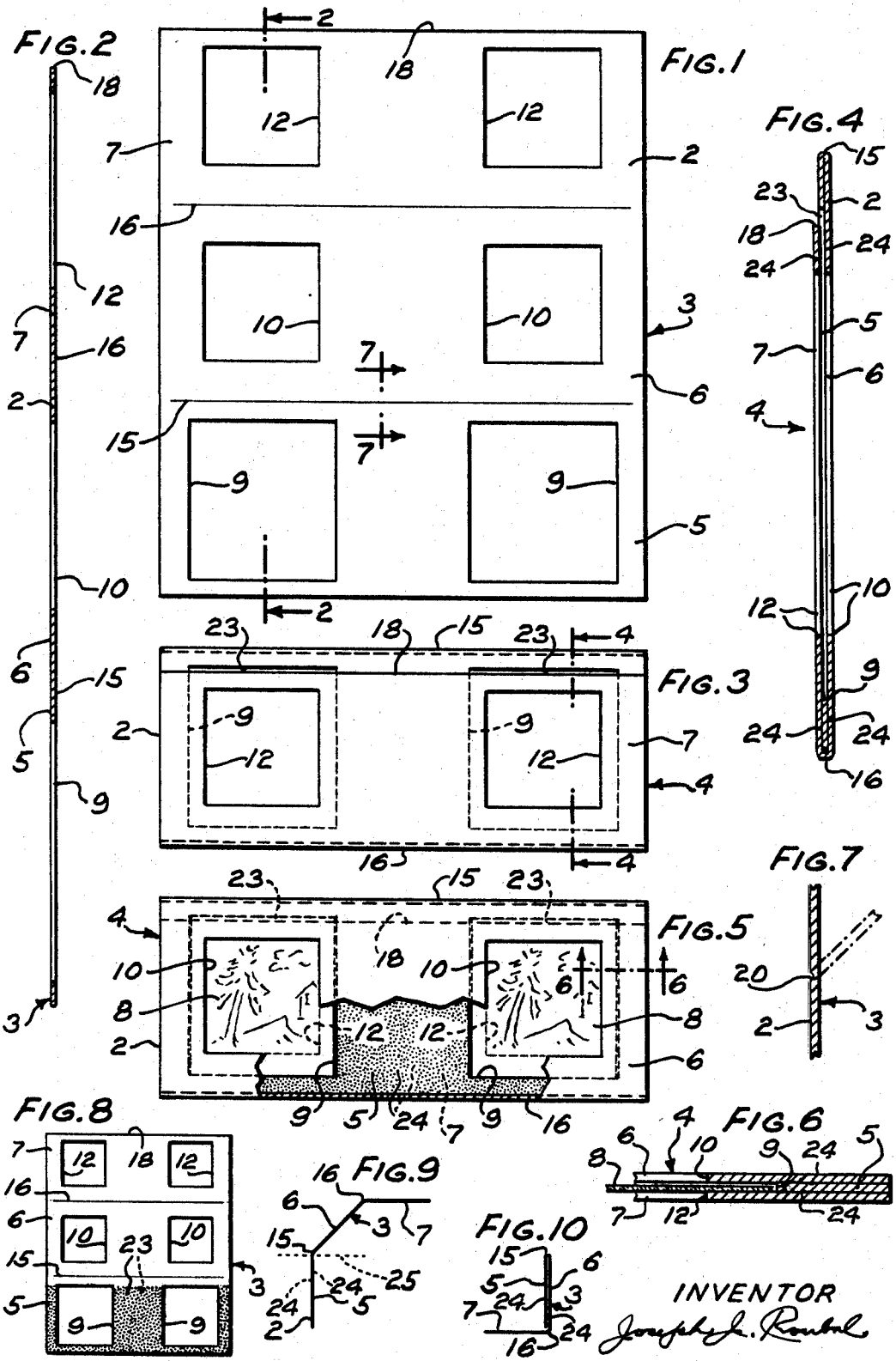

3,389,485
FILM STRIP MOUNT
Joseph J. Roubal, 5135 W. 22nd Place,
Cicero, Ill. 60650
Filed Mar. 2, 1966, Ser. No. 541,876
3 Claims. (Cl. 40—159)

ABSTRACT OF THE DISCLOSURE

In a film strip mount a cardboard sheet or the like provides a film strip carrying and confining cavity and provides marginal framing of a film strip as such locates in the carrying and confining cavity. A terminal edge cooperates to form an opening in connection with the carrying and confining cavity for acceptance thereby of the film strip.

---

This invention relates to film strip mounts as are used more especially for viewing in stereoscopes or stereo viewing devices of stereo complementary pictures.

It is the object of the invention to provide a single structural form to the end of producing in a simple manner a film strip mount.

Another object of the invention is to provide a film strip mount that in the process of being formed lends itself in a simple manner to cementing or gluing.

An important object of the invention is to provide a mount in which stereo complementary picture film strips, as are cut from a longer length of an exposed and processed photographic film, are readily inserted.

The foregoing and other objects and advantages in view will become apparent from the accompanying specification in connection with the drawings, in which:

FIG. 1 shows a plan view of a structural form arranged in accordance with the invention.

FIG. 2 is an enlarged vertical section taken on 2—2 of FIG. 1.

FIG. 3 is a rear elevational view of a film strip mount embodying the invention.

FIG. 4 is an enlarged vertical section taken on 4—4 of FIG. 3.

FIG. 5 is a front elevational view of the film strip mount as considered in FIG. 3.

FIG. 6 is an enlarged section taken on 6—6 of FIG. 5.

FIG. 7 is a vertical section taken on 7—7 of FIG. 1 here illustrating self-effective manner of causing the bend in the operation of folding.

FIG. 8 shows on a reduced scale the structural form shown in FIG. 1 and further shows cement or glue carried thereby.

FIG. 9 is a schematic view on a reduced scale illustrating in one instance the initial bending of the structural form.

FIG. 10 is a schematic view illustrating in one instance a folding of the structural form.

It should be understood that a film strip mount of a type here considered normally structurally comprises components as follows: a central plate, a frontal plate, and a rear plate.

For a single photographic picture, a single film strip mount has perforated in the central plate a single film strip carrying and confining cavity. And a single continuous marginal frame is perforated in the frontal and rear plate, respectively.

Again, for a stereo picture photograph, a stero film strip mount has perforated in the central plate a pair of film strip carrying and confining cavities. And a pair of continuous marginal frames are perforated in the frontal plate and rear plate, respectively.

A cement or glue is applied to maintain the assembly of the central plate centrally between the outer positioned frontal plate and rear plate.

In accordance with the present invention, as is shown in the drawings, integral sections of a sheet 2, of cardboard, or which may be aluminum or plastic, are arranged to provide a structural form 3 and which effects, as is shown in FIGS. 3, 4 and 5, a stereo picture photograph film strip mount 4. The structural form 3 as is shown comprises a central plate section 5, a frontal plate section 6, and a rear plate section 7.

Since the cardboard sheet 2 has a thickness on the order of .010 inch (.254 mm.) approximately, such will readily accommodate, as is shown in FIGS. 5 and 6, respective film strips 8, 8 being carried and confined flatly in cavities 9, 9 that are perforated in the central plate section 5.

Perforated in the frontal plate section 6 are continuous marginal frames 10, 10, and similarly perforated in the rear plate section 7 are continuous marginal frames 12, 12.

It is understood the preferred arrangement of the plate sections is, as is shown in FIG. 1, although within the spirit of the invention if desirable an arrangement, not shown, may be as follows: plate sections 6, 5 and 7 the latter being the rear plate section.

In accordance with the invention, the structural form 3 as is provided by the cardboard sheet 2 is subject to the operation of folding. And to this end, as is indicated in FIG. 1, two transverse folds are arranged for at transverse parallel lines 15, 16. And it will be seen that by means of the folds effected at the transverse parallel lines 15, 16, three substantially equal longitudinal lengths consisting of the sections 5, 6 and 7 are obtained. And it will be seen that these longitudinal lengths of section principally differ thus due to the rear plate section 7 being somewhat shorter, as appears more clearly in FIGS. 3 and 4.

As is shown in FIGS. 1, 3 and 5, a transverse edge 18 constitutes the rear plate section 7. This transverse edge 18, as is shown, is the other terminal edge of the cardboard sheet 2.

Attention is directed to the film strip carrying and confining cavities as are perforated in the central plate section 5, These carrying and confining cavities 9, 9 by their respective opposite edges, as is shown in FIGS. 5 and 6, are arranged to precisely mount the film strips 8, 8 for viewing.

In accordance with the shorter arranged rear plate section 7, the transverse terminal edge 18 is arranged openly spaced at 23, 23, as is shown in FIGS. 3, 4 and 5, thus with respect to one edge, and such being the top horizontal edge of the film strip carrying and confining cavities 9, 9, respectively.

The open spacings 23, 23, as is shown, provide access to the film strip carrying and confining cavities 9, 9 and, it is understood, such permit insertion thereby of the film strip 8, 8 into these carrying and confining cavities 9, 9.

It is understood that the operation of folding of the three substantially equal lengths of section 5, 6 and 7, as is described, to the end of forming the stereo picture film strip mount 4 of necessity requires initial bending of the cardboard sheet 2 at the transverse lines 15, 16.

As contemplated, in one form such initial bending may be performed by suitable mechanical means.

In a preferred form, however, it is desirable, that the bending is self-effective, and to this end, as is shown by FIG. 7, a suitable line depression or furrow 20 transversely of the sheet 2 for each of the transverse lines 15, 16 is provided.

There has been described above that the assembly of the film strip transparency support requires that cement or glue (or paste) be applied to maintain the assembly. In this consideration reliable cementing or gluing of the assembly is required thus since the .010 inch (.254 mm.) approximate spacing is desired to be maintained at the cavities 9, 9 of the central plate section 5 and which involves the continuous marginal frames 10, 10 and 12, 12 of the frontal and rear plate sections 6 and 7, respectively.

In FIG. 8, the structural form 3 is shown having cement or glue 23 carried inactivate or dry at both sides of the central plate section 5.

It will be seen that on bending of the structural form 3 at the transverse lines 15, 16, the cardboard sheet 2 assumes the polygonal form substantially, as is shown in FIG. 9. And it will be seen that therewith the central plate section 5 may be wetted to activate the carried cement or glue. Also it will be seen that cement or glue 24 may be applied on the central plate section 5, which, for example, may be in one instance by spraying or in another instance by immersion into cement or glue to this end indicated by the level line 25.

And it will be seen that immediately upon activating of or actual applying of the cement or glue on the central plate section 5, as is described, that therewith by a folding, here involving the transverse line 15, the central plate section 5, at one side, and the frontal plate section 6 are conveniently brought together to be juxtaposed, as is illustrated in FIG. 10. And it will be seen that, therewith, by a folding, now involving the transverse line 16, the central plate section 5, at its other side, and the rear plate section 7 are conveniently brought together to be juxtaposed, which in such finished form is shown in FIG. 4 (and also in FIGS. 3 and 5).

Since immediately upon completing the folding of the structural form 3, as is above described, the cement or glue will not at once effectively hold the folded assembly together, and, over-all flatness in the formed stereo picture film strip mount is more especially desired, the structural form, when just folded, as is described, is preferably placed between two flat platens thus until full drying and the desired flatness is assured.

What is claimed is:

1. A structural form for forming a film strip mount comprising a cardboard sheet or the like having when folded transversely twice three longitudinal lengths which in the formed film strip mount provide a central plate section, a frontal plate section and a rear plate section, the central plate section of said cardboard sheet or the like being perforated to provide a film strip carrying and confining cavity and the frontal plate section of said cardboard sheet or the like being perforated to provide a continuous marginal framing of a film strip when such is carried and confined in said film strip carrying and confining cavity and the rear plate section of said cardboard sheet or the like being perforated to provide a continuous marginal framing of a film strip when such is carried and confined in said film strip carrying and confining cavity and said rear plate section constituting the other terminal edge of said cardboard sheet or the like and in the formed film strip mount said other terminal edge being arranged openly spaced with respect to one edge of said film strip carrying and confining cavity and whereby in the formed film strip mount such provides access to and permits that a film strip may be inserted into said film strip carrying and confining cavity.

2. In a film strip mount, a cardboard sheet or the like, said cardboard sheet or the like being folded transversely twice and thereby having juxtaposed a central plate section, a frontal plate section and a rear plate section and which rear plate section constitutes the other terminal edge of said cardboard sheet or the like, the central plate section of said cardboard sheet or the like being perforated to provide a film strip carrying and confining cavity and the frontal plate section of said cardboard sheet or the like being perforated to provide a continuous marginal framing of a film strip when such is carried and confined in said film strip carrying and confining cavity and the rear plate section of said cardboard sheet or the like being perforated to provide a continuous marginal framing of a film strip when such is carried and confined in said film strip carrying and confining cavity and whereby said other terminal edge of said cardboard sheet or the like is arranged openly spaced with respect to one edge of said film strip carrying and confining cavity and which provides access to and permits that thereby a film strip may be inserted into said film strip carrying and confining cavity.

3. A structural form for forming a film strip mount comprising a cardboard sheet or the like which when folded provides in the formed film strip mount an inner plate section and an outer plate section, the inner plate section of said cardboard sheet or the like being perforated to provide a film strip carrying and confining cavity and the outer plate section of said cardboard sheet or the like being perforated to provide a continous marginal framing of a film strip when such is carried and confined in said film strip carrying and confining cavity and said outer plate section constituting the other terminal edge of said cardboard sheet or the like and in the formed film strip mount said other terminal edge being arranged openly spaced with respect to one edge of said film strip carrying and confining cavity and whereby in the formed film strip mount such provides access to and permits that a film strip may be inserted into said film strip carrying and confining cavity.

References Cited
UNITED STATES PATENTS

| | | | |
|---|---|---|---|
| 2,739,401 | 3/1956 | Balter | 40—158 |
| 2,834,136 | 5/1958 | Kiehl et al. | 40—159 |
| 2,843,955 | 7/1958 | Engelstein | 40—158 |
| 1,397,096 | 11/1921 | Hammar | 40—16 |

EUGENE R. CAPOZIO, *Primary Examiner.*

W. J. CONTRERAS, *Examiner.*